United States Patent [19]

Green et al.

[11] Patent Number: 5,217,065
[45] Date of Patent: Jun. 8, 1993

[54] FEEDER TUBE AND AN APPARATUS FOR ENABLING HEAT TRANSFER BETWEEN A FIRST FLUID AND AN ELONGATE ELEMENT

[75] Inventors: Robert H. Green; William J. Lewis, both of Upton, United Kingdom

[73] Assignee: Electricity Association Technology Limited, United Kingdom

[21] Appl. No.: 810,967

[22] Filed: Dec. 20, 1991

[30] Foreign Application Priority Data

Dec. 20, 1990 [GB] United Kingdom ............... 9027612

[51] Int. Cl.$^5$ ............... F28B 9/04; F28D 3/02; F28D 3/04
[52] U.S. Cl. ................... 165/117; 165/115; 239/597
[58] Field of Search ............. 165/115, 117; 239/542, 239/597

[56] References Cited

U.S. PATENT DOCUMENTS

| | | | |
|---|---|---|---|
| 751,058 | 2/1904 | Cracknell | 165/117 X |
| 3,213,935 | 10/1965 | Reid, Jr. | 165/117 |
| 3,552,654 | 1/1971 | Thomas | 239/542 |
| 3,777,987 | 12/1973 | Allport | 239/542 |
| 4,667,882 | 5/1987 | Pacifici | 239/455 |
| 4,948,295 | 8/1990 | Pramsoleo | 405/44 |

FOREIGN PATENT DOCUMENTS

| | | | |
|---|---|---|---|
| 144690 | 2/1951 | Australia | 165/117 |
| 5556 | 7/1879 | Fed. Rep. of Germany | 165/115 |
| 104332 | 8/1874 | France | 165/117 |
| 8500033 | 8/1986 | Netherlands | 165/117 |
| 19566 | 6/1899 | Switzerland | 165/117 |
| 348846 | 9/1972 | U.S.S.R. | 165/115 |
| 570993 | 8/1945 | United Kingdom . | |
| 668293 | 3/1952 | United Kingdom . | |
| 1033187 | 6/1966 | United Kingdom . | |
| 1497204 | 1/1978 | United Kingdom . | |
| 1498545 | 1/1978 | United Kingdom . | |
| 2004451 | 4/1979 | United Kingdom . | |
| 2040151 | 8/1980 | United Kingdom . | |
| 2232865 | 1/1991 | United Kingdom . | |

*Primary Examiner*—Allen J. Flanigan
*Attorney, Agent, or Firm*—Kinney & Lange

[57] ABSTRACT

A feeder tube (26) for outputting a liquid evenly along its length is formed of an inner tube (40) and an outer tube (42), each having a split (48,50) along at least part of their lengths. The splits (48,50) are positioned away from each other thus allowing liquid in the inner and outer tubes (40,42) through the split (48) in the inner tube (40) and into a gap (44) between the inner and outer tubes (40,42). The liquid is then output from the feeder tube (26) through the split (50) in the outer tuber (42). The feeder tube (26) is incorporated in apparatus for enabling heat transfer between a fluid and an elongate element (22). In the apparatus at least one feeder tube (26) is positioned above and at least in part parallel to the elongate element (22), whereby an even film of the fluid in liquid form is formed on at least a part of the elongate element (22).

13 Claims, 4 Drawing Sheets

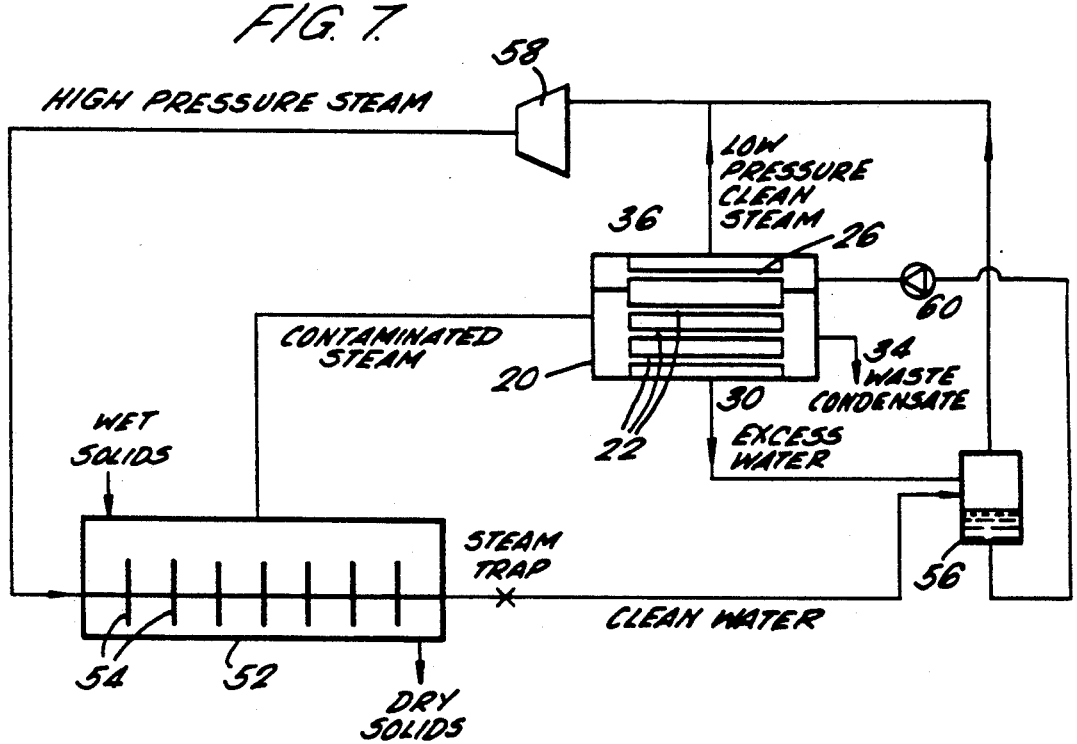
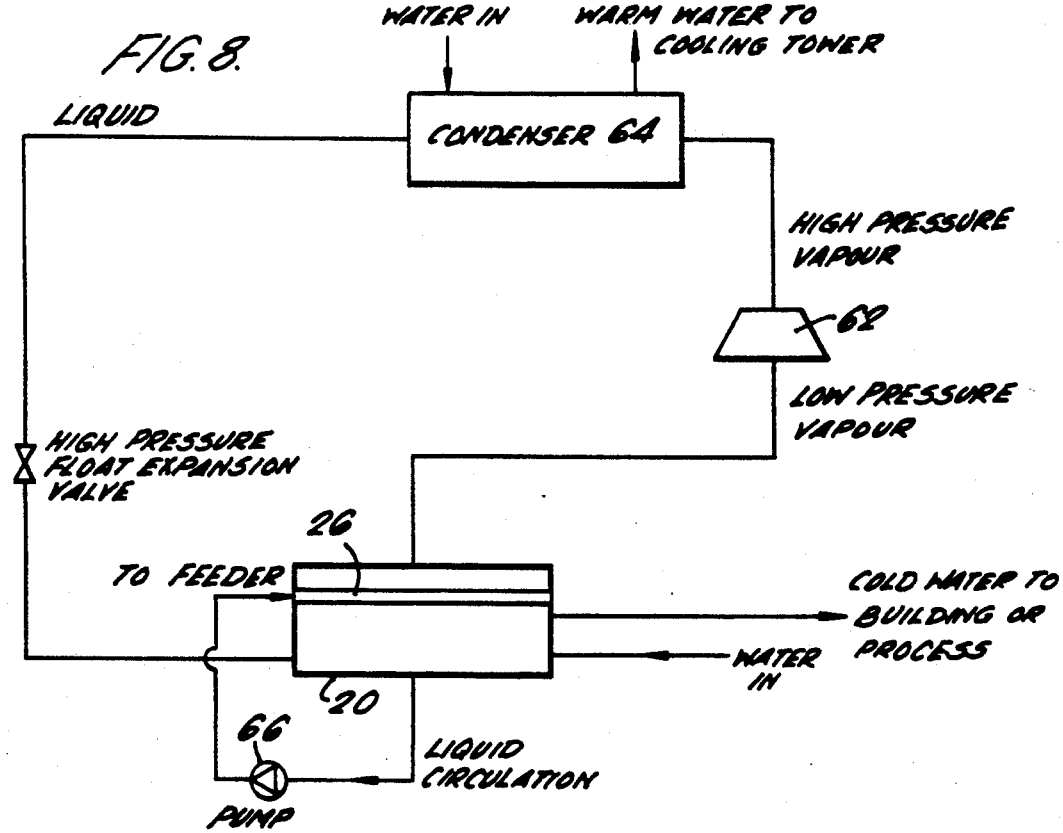

FEEDER TUBE AND AN APPARATUS FOR ENABLING HEAT TRANSFER BETWEEN A FIRST FLUID AND AN ELONGATE ELEMENT

BACKGROUND OF THE INVENTION

1. Field of the Invention

The present invention relates to a feeder tube for outputting a liquid along at least part of its length.

The present invention also relates to an apparatus for enabling heat transfer between a first fluid and an elongate element. Such an apparatus may be used to exchange heat between two systems, the first fluid forming part of the first system and the elongate element forming part of the second system. The second system may include a second fluid flowing through the elongate element so that heat transfer between the first and second fluids can be effected. The apparatus may also be incorporated in an apparatus used to evaporate the first fluid in liquid form.

2. Description of the Prior Art

FIG. 1 shows a prior art apparatus 2 used to evaporate a fluid 4 which is in liquid form. The apparatus 2 includes a plurality of heating elements 6 which extend along a drum 8. The drum 8 is at least partially filled with the fluid 4 so that the heating elements 6 are covered. When the heating elements are switched on, the liquid 4 is evaporated, the vapour passing out of the drum 8 through an outlet 9. Such an apparatus is an inefficient heat exchanger because the majority of the liquid 4 is not in contact with the heating surfaces of the heating elements 6.

FIG. 2 shows a second prior art apparatus 10 which comprises a plurality of heating elements 12 extending along a drum 14. Liquid is introduced into the drum 14 via a plurality of spray nozzles 16 on the internal surface of the drum 14. As the liquid is sprayed into the drum 14, it forms a film of liquid on the external surfaces of the heating elements 12. Accordingly, the heat exchange between the heating elements 5 and the liquid is improved in comparison with the embodiment of FIG. 1.

SUMMARY OF THE INVENTION

It is an object of the present invention to provide a feeder tube for outputting a liquid evenly along its length.

It is also an object of the present invention to provide an improved apparatus for enabling heat transfer between a first fluid and an elongate element.

The feeder tube of the present invention outputs liquid evenly along at least part of its length, and is formed from two spaced concentric tubes, each having a split along at least part of their lengths. The splits in the tubes are positioned away from each other thus allowing liquid in the inner tube to pass through the split in the inner tube and into a gap between the inner and outer tubes. The liquid is then output from the feeder tube through the split in the outer tube.

When the feeder tube of the present invention is incorporated in apparatus for enabling heat transfer between a fluid and an elongate element, at least one feeder tube is positioned above and at least in part parallel to the elongate element, whereby an even film of said fluid in liquid form is formed on at least a part of the elongate element.

In comparison with the prior art, the feeder tube in the apparatus of the present invention enables the first fluid in liquid form to be introduced along a length of the apparatus to enable an even film of said first fluid in liquid form to be formed along at least a part of the elongate element without the need for a plurality of inlets into the apparatus for the introduction of said first fluid. The formation of an even film of said first fluid in liquid form along at least a part of the elongate element provides for efficient heat transfer between said first fluid and the elongate element.

Advantageously a layer of material is positioned between the inner tube and the outer tube to define the gap and so further to control the even distribution of the first fluid in liquid form along at least a part of the elongate element.

BRIEF DESCRIPTION OF THE DRAWINGS

FIGS. 7 and 8 show schematically systems incorporating the apparatus of the present invention.

DESCRIPTION OF PREFERRED EMBODIMENT

Figure 1:
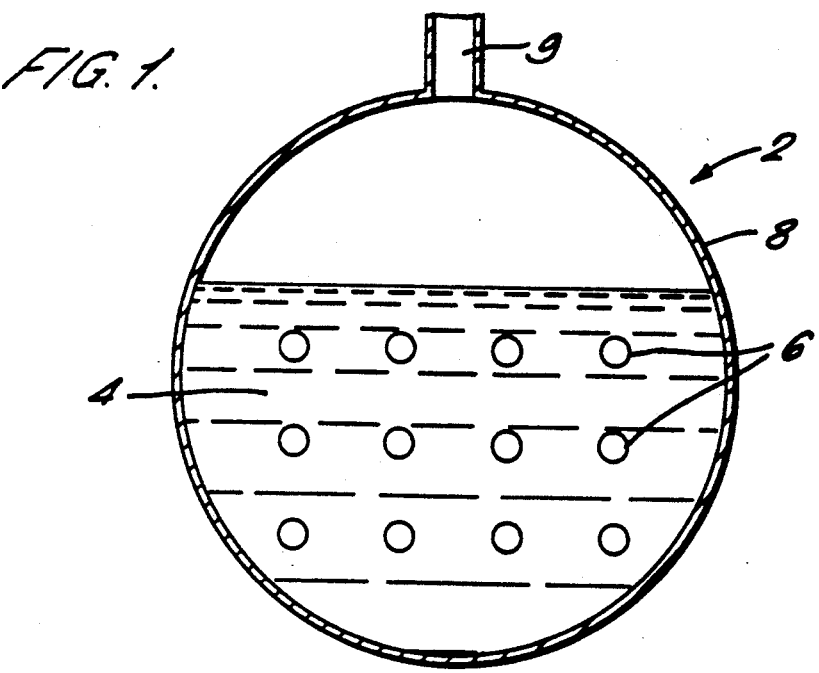
FIGS. 1 and 2 show prior art apparatus for enabling heat transfer between a first fluid and an elongate element as described hereinbefore.
Figure 2:
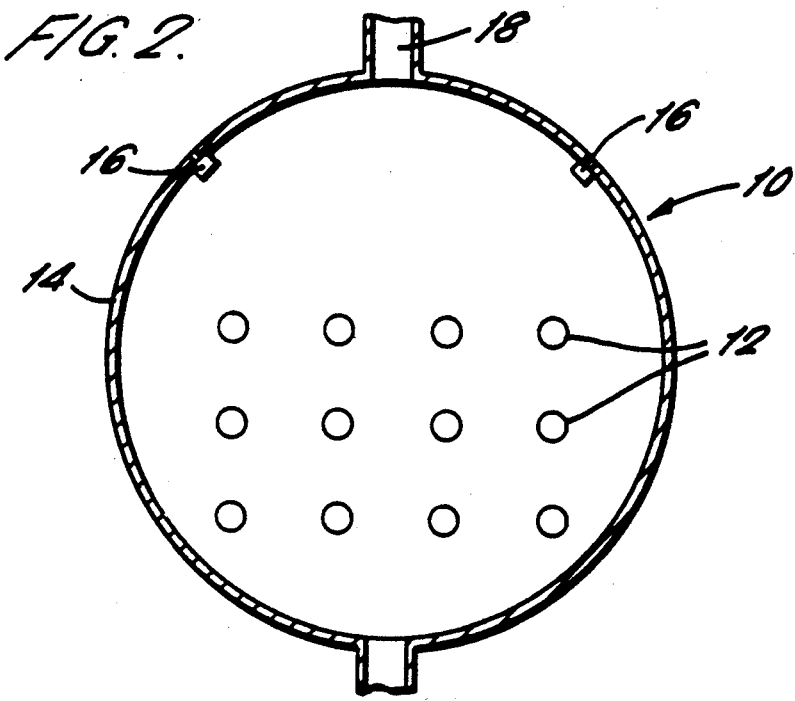
Figure 3:
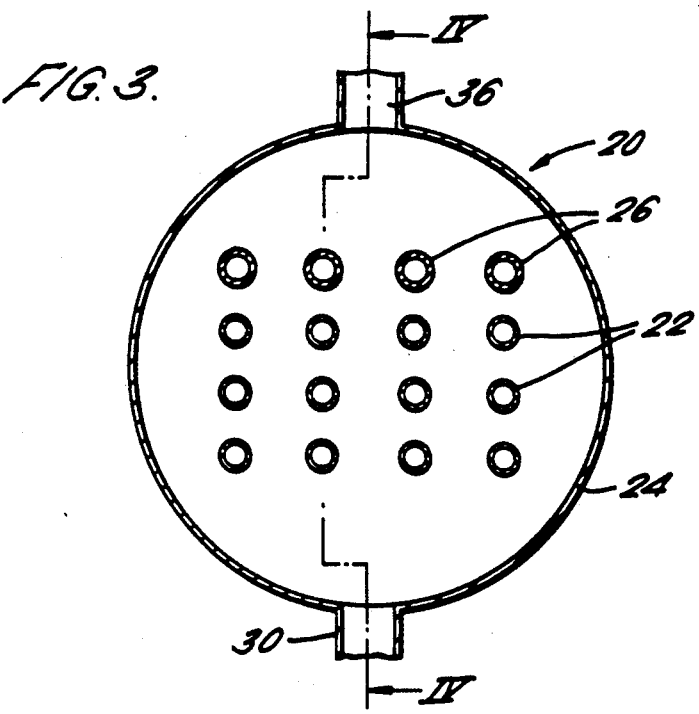
FIG. 3 shows a schematic cross section of an apparatus for enabling heat transfer between a first fluid and an elongate element, the apparatus including a feeder tube in accordance with the present invention.

As shown in FIG. 3, an apparatus for enabling heat transfer between a first fluid and an elongate element comprises a plurality of elongate elements 22 extending along the length of a drum 24. One or more feeder tubes 26 are positioned above and parallel to one or more of the elongate elements 22. A first fluid in liquid form is introduced into the feeder tubes 26 via an inlet 28. As indicated previously, the feeder tube is formed so that liquid within the feeder tube can leak therefrom. Because of the relative position of the feeder tubes 26 and the elongate elements 22, an even film of the first fluid in liquid form is formed along the length of the elongate elements 22. An outlet 30 is provided to enable any liquid collecting at the bottom of the drum 24 to be drained away.

Figure 4:
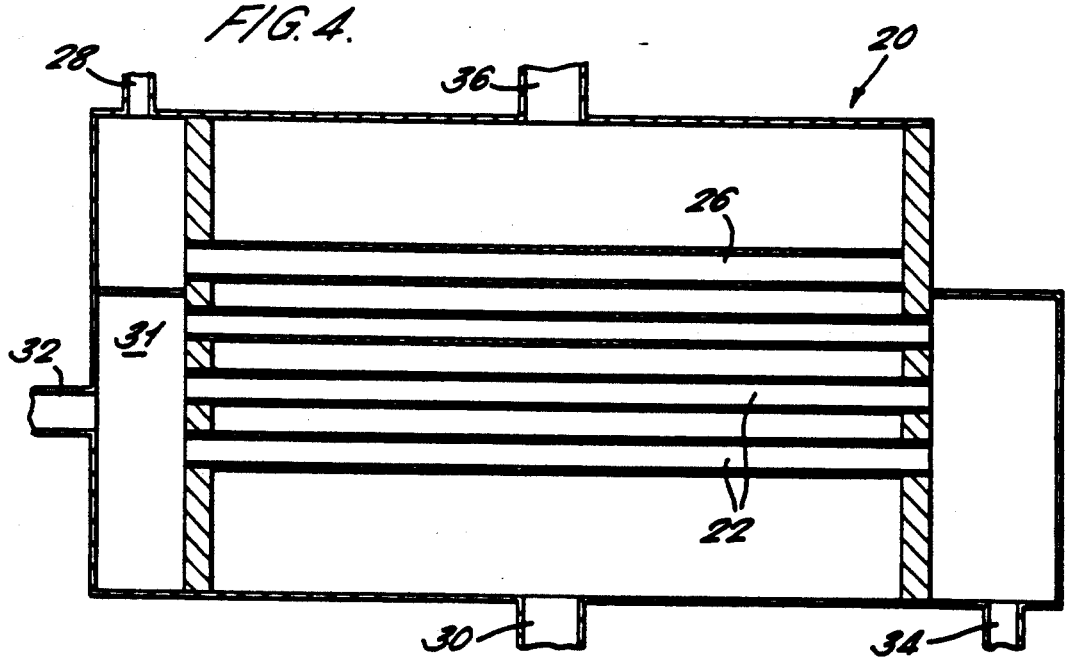
FIG. 4 shows a schematic cross section along the line IV—IV of FIG. 3.

Means are provided to determine the temperature of the elongate elements 22. The elongate elements 22 may be heating elements, in which case the determining means is a power supply, possibly in combination with a thermostat. In the example of FIGS. 3 and 4, the elongate elements 22 are pipes, typically made of copper or stainless steel, and the determining means comprises a second fluid 31 which is introduced into the pipes via an inlet 32 and drained therefrom by an outlet 34. If the second fluid 31 is at a sufficiently high temperature, the pipes 22 are effective as heating elements. Accordingly, the film of the first fluid which forms around the pipes 22 evaporates, passing out from the drum via an outlet 36. Alternatively, the second fluid 31 may be a cooling fluid in which case heat is transferred from the first fluid to the second fluid, the first fluid being cooled and the second fluid being heated.

Figure 5:
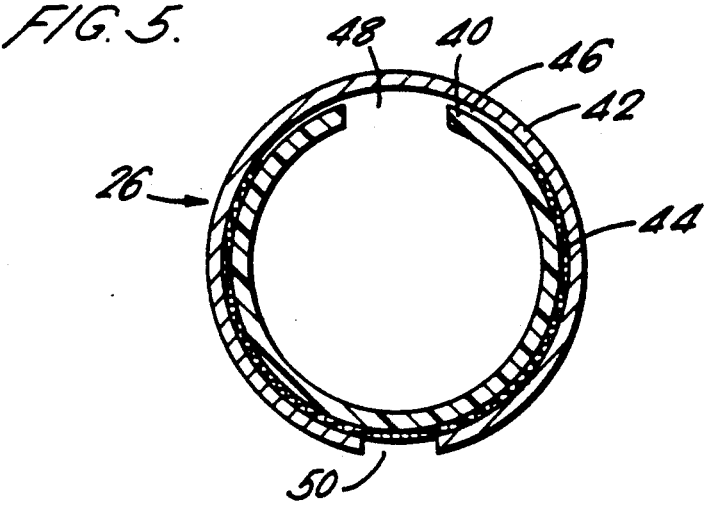
FIG. 5 shows a schematic cross section of a feeder tube of the apparatus of FIGS. 3 and 4.
Figure 6:
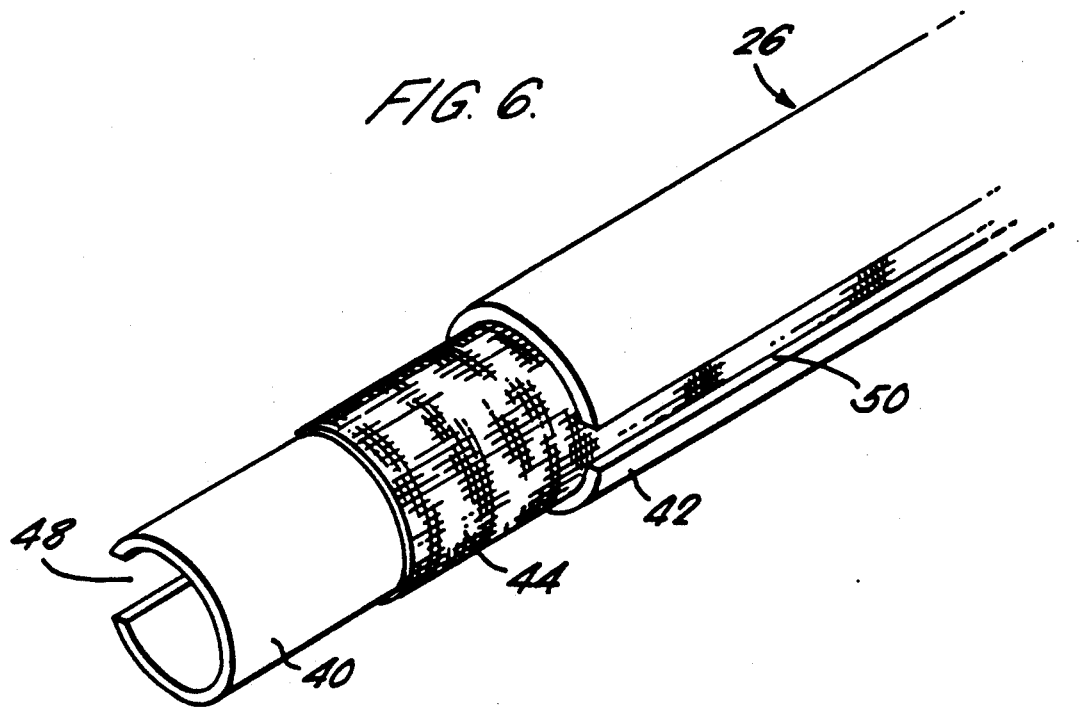
FIG. 6 shows a perspective view, with part broken away, of the feeder tube of FIG. 5.

FIGS. 5 and 6 show an embodiment of the feeder tube 26 of FIGS. 3 and 4 in greater detail. The feeder tube 26, which is typically of diameter in the range of from 10 mm to 25 mm, consists of an inner tube 40 within an outer tube 42. The outer tube 42 is typically made of copper or stainless steel. The inner tube 40 may be either a metal or a plastic. A mesh 44 is provided between the inner tube 40 and outer tube 42 and defines the thickness of a gap 46 between the inner and outer tubes 40, 42. The mesh may be made of metal or plastic. One example used a woven polypropelene mesh with a thread of 0.25 mm giving a mesh thickness of 0.4 mm.

The inner tube 40 is split along at least a part of its length to define an inner opening 48 through which fluid in the inner tube 40 can pass into the gap 46. The outer tube 42 is also split along at least a part of its length to define an outer opening 50 through which liquid that has collected in the gap 46 can leak out. In the feeder tube 26 shown, the inner tube 40 is orientated so that its inner opening 48 is uppermost and the outer tube 42 is orientated so that its outer opening 50 is lowermost.

When a liquid is introduced to the feeder tube 26, the liquid fills the inner tube 40. Only when the length of the inner tube 40 is filled with the liquid overflow through the inner opening 48 into the gap 46. As well as defining the thickness of the gap 46, the mesh 44 is effective as a wick further to ensure that the liquid is distributed evenly along the length of the feeder tube 26. As the mesh 44 becomes saturated with the liquid, it drips out through the outer opening 50 along its length. In this way, the feeder tube 26 provides an extended outlet along which liquid therein may be distributed evenly.

An apparatus for enabling heat transfer between a first fluid and an elongate element provided in accordance with the present invention and described previously may be utilised in a number of different applications.

As indicated previously, the apparatus may be utilised specifically as a heat exchanger.

The apparatus could be used to provide clean steam from a source of contaminated steam. FIG. 7 shows the combination of an apparatus as shown in FIGS. 3 and 4 with a dryer 52 for drying wet solids. Steam at a high pressure is introduced into hollow rotating discs 54 within the dryer 52. The water in any wet solids introduced into the dryer 52 is evaporated due to heat transfer from the high pressure steam. The hollow rotating discs 54 are provided in the dryer 52 so that the solids are carried along the length of the dryer 52 and are dried during the process. An outlet for the dried solids is provided at the opposite end of the dryer 52 from the inlet for the wet solids. The high pressure steam condenses within the discs 54 of the dryer 52. This condensed steam is collected and passed to a tank 56. The moisture evaporated from the wet solids is a source of steam but is likely to be contaminated by minute particles of the solids being dried. The contaminated steam is passed to the apparatus 20.

Clean water is fed to the feeder tube 26 of the apparatus 20 from the tank 56. The clean water leaks from the feeder tube 26 onto the elongate elements 22 below the feeder tube 26. Accordingly, a thin even film of clean water is produced on the elongate elements 22. The elongate elements 22 take the form of pipes through which the contaminated steam flows. As the clean water on the outside of the pipes is at a slightly lower temperature than the contaminated steam, the contaminated steam condenses on the internal surfaces of the pipes. The heat released by this condensation evaporates the clean water on the outside of the elongate elements 22, producing clean steam. This clean steam together with any steam from the tank 56 is passed though a steam compressor 58 to produce high pressure steam for recirculation through the dryer 52. If necessary, a pump 60 may be provided to transfer water from the tank 56 to the feeder tube 26 in the apparatus 20.

The apparatus 20 of FIGS. 3 and 4 may also be used in a refrigerator or an air conditioning system, as shown in FIG. 8. In the system of FIG. 8, the apparatus 20 is being used essentially as an evaporator. A cooling fluid is fed through the feeder tube 26 to form an even film along the length of the elongate elements (not shown) which form part of the system to be cooled. As the cooling fluid evaporates from the elongate elements, it takes heat from the elongate elements which are thus cooled. The evaporated cooling fluid, which is at a low pressure, is passed through a compressor 62 and then into a condensor 64. Heat exchange between the high pressure vapour and water condenses the evaporated cooling liquid to liquid form which is then recirculated. In the schematic diagram of FIG. 8, the condensed cooling liquid is returned to the apparatus 20 where it is collected, together with any cooling liquid which did not evaporate, and recirculated via a pump 66 to the feeder tube 26.

In FIG. 8, the elongate elements which form part of the system to be cooled comprise a plurality of pipes through which water is allowed to flow. The cold water produced by the heat transfer is introduced into the building or process to be cooled. The use of the apparatus according to the present invention in such a refrigeration or air conditioning system minimises the amount of cooling liquid required within the system.

Other possible applications in which an apparatus according to the present invention may be used include heat transformers, absorption heat pumps, desalination of sea water, heat pumps and ocean thermal energy conversion.

Modifications to the embodiment described within the scope of the present invention will be apparent to those skilled in the art.

We claim:

1. A feeder tube for outputting a liquid along at least a part of its length, the feeder tube comprising an inner tube within an outer tube, said inner tube being split along at least a part of its length to define an inner opening whereby a liquid can pass into a gap between said inner tube and said outer tube, said outer tube being split along at least a part of its length to define an outer opening whereby liquid within the gap can leak out through said outer opening, said inner opening and said outer opening being positioned away from each other and wherein a layer of porous material is positioned between said inner tube and said outer tube and wherein the layer of porous material is a mesh.

2. A feeder tube as claimed in claim 1 wherein said inner opening and said outer opening are positioned opposite each other.

3. Apparatus for enabling heat transfer between a fluid and an elongate element, said apparatus comprising the elongate element and a feeder tube for outputting said fluid in a liquid form along at least part of its length, said feeder tube comprising an inner tube within an outer tube, said inner tube being split along at least a part of its length to define an inner opening whereby said fluid in liquid form can pass into a gap between said inner tube and said outer tube, said outer tube being split along at least part of its length to define an outer opening whereby said fluid in liquid form within said gap can leak out through said outer opening, said inner opening and said outer opening being positioned away from each other and a layer of porous material being positioned between said inner tube and said outer tube, said feeder tube being positioned above and at least partly parallel to said elongate element, whereby an even film of said fluid in liquid form is formed on at least a part of said elongate member.

4. Apparatus as claimed in claim 3 wherein said inner opening and said outer opening are positioned opposite each other.

5. Apparatus as claimed in claim 3 wherein said outer tube is orientated as that said outer opening is lowermost.

6. Apparatus as claimed in claim 5 wherein said inner tube is orientated so that said inner opening is uppermost.

7. Apparatus as claimed in claim 3 wherein the layer of material is a mesh.

8. Apparatus as claimed in claim 3 wherein the feeder tube and the elongate element are parallel to each other.

9. Apparatus as claimed in claim 3 comprising a plurality of elongate elements and at least one feeder tube wherein each elongate element is positioned below a feeder tube.

10. Apparatus as claimed in claim 9 including a plurality of feeder tubes.

11. Apparatus as claimed in claim 3 including determining means for determining the temperature of said elongate element.

12. Apparatus as claimed in claim 11 wherein said determining means comprises means for heating said elongate element.

13. Apparatus as claimed in claims 11 wherein said determining means includes means for introducing a second fluid into the elongate element whereby heat transfer between said fluid and said second fluid can be effected.

* * * * *

UNITED STATES PATENT AND TRADEMARK OFFICE
CERTIFICATE OF CORRECTION

PATENT NO. : 5,217,065
DATED : June 8, 1993
INVENTOR(S) : ROBERT H. GREEN, WILLIAM J. LEWIS It is certified that error appears in the above-identified patent and that said Letters Patent is hereby corrected as shown below:

Col. 6, line 17, delete "claims 11", insert --claim 11--

Signed and Sealed this

First Day of February, 1994

*Attest:*

BRUCE LEHMAN

*Attesting Officer*  *Commissioner of Patents and Trademarks*